US010005922B2

United States Patent
Noguchi et al.

(10) Patent No.: US 10,005,922 B2
(45) Date of Patent: Jun. 26, 2018

(54) ACTIVE RAY-CURABLE COMPOSITION, AND ACTIVE RAY-CURABLE INKJET PRINTING INK COMPOSITION AND ACTIVE RAY-CURABLE ADHESIVE COMPOSITION USING THE SAME

(71) Applicants: Soh Noguchi, Kanagawa (JP); Okitoshi Kimura, Kanagawa (JP); Koji Arimitsu, Tokyo (JP)

(72) Inventors: Soh Noguchi, Kanagawa (JP); Okitoshi Kimura, Kanagawa (JP); Koji Arimitsu, Tokyo (JP)

(73) Assignees: RICOH COMPANY, LTD., Tokyo (JP); Tokyo University of Science Foundation, Tokyo (JP)

( * ) Notice: Subject to any disclaimer, the term of this patent is extended or adjusted under 35 U.S.C. 154(b) by 439 days.

(21) Appl. No.: 13/955,581

(22) Filed: Jul. 31, 2013

(65) Prior Publication Data
US 2014/0045965 A1   Feb. 13, 2014

(30) Foreign Application Priority Data

Aug. 10, 2012  (JP) ................. 2012-177895
Jun. 11, 2013  (JP) ................. 2013-122531

(51) Int. Cl.
| | | |
|---|---|---|
| C09D 135/02 | (2006.01) | |
| C08F 222/10 | (2006.01) | |
| C09D 11/101 | (2014.01) | |
| C09J 135/02 | (2006.01) | |
| C09D 11/38 | (2014.01) | |
| C09D 11/30 | (2014.01) | |
| C09J 4/00 | (2006.01) | |

(52) U.S. Cl.
CPC ...... *C09D 135/02* (2013.01); *C08F 222/1006* (2013.01); *C09D 11/101* (2013.01); *C09D 11/30* (2013.01); *C09D 11/38* (2013.01); *C09J 135/02* (2013.01); *C09J 4/00* (2013.01)

(58) Field of Classification Search
CPC .... C09D 135/02; C09D 11/30; C09D 11/101; C09D 11/38; C09J 135/02; C09J 4/00; C08F 2/50; C08F 222/1006
See application file for complete search history.

(56) References Cited

U.S. PATENT DOCUMENTS

| 5,539,017 A | 7/1996 | Rheinberger et al. | |
|---|---|---|---|
| 2004/0063030 A1* | 4/2004 | Barr et al. ............... | 430/270.1 |
| 2004/0242867 A1* | 12/2004 | Baudin ................ | C07D 487/04 540/594 |
| 2005/0027082 A1 | 2/2005 | Narayan-Sarathy et al. | |
| 2005/0080162 A1 | 4/2005 | Narayan-Sarathy et al. | |
| 2005/0081994 A1 | 4/2005 | Beckley et al. | |
| 2005/0245721 A1 | 11/2005 | Beckley et al. | |
| 2006/0069234 A1* | 3/2006 | Kauffman ............. | C08F 220/26 528/302 |
| 2006/0128825 A1 | 6/2006 | Fansler et al. | |
| 2007/0173602 A1 | 7/2007 | Brinkman et al. | |
| 2011/0028585 A1* | 2/2011 | Shiraishi ............... | C07C 211/63 522/63 |
| 2011/0060100 A1 | 3/2011 | Kimura et al. | |
| 2011/0233048 A1* | 9/2011 | Kuramoto ............. | C07C 271/12 204/157.82 |
| 2012/0086762 A1 | 4/2012 | Noguchi et al. | |
| 2012/0147103 A1 | 6/2012 | Hasegawa et al. | |
| 2012/0176456 A1 | 7/2012 | Maekawa et al. | |
| 2012/0242768 A1 | 9/2012 | Seno et al. | |
| 2012/0283378 A1 | 11/2012 | Shoshi et al. | |
| 2013/0005849 A1 | 1/2013 | Noguchi et al. | |
| 2013/0065024 A1 | 3/2013 | Aruga et al. | |

FOREIGN PATENT DOCUMENTS

| EP | 1342737 A1 | 9/2002 |
|---|---|---|
| EP | 1342738 A1 | 9/2003 |
| EP | 1359173 A1 | 11/2003 |
| EP | 1462501 A1 | 9/2004 |
| EP | 1593727 A1 | 11/2005 |
| JP | H7-258018 | 10/1995 |
| JP | 2642324 | 5/1997 |
| JP | 2003-327898 | 11/2003 |
| JP | 2004-209471 | 7/2004 |
| JP | 2005-060520 | 3/2005 |
| JP | 2006-510779 | 3/2006 |
| JP | 2007-500767 | 1/2007 |
| JP | 2007-511641 | 5/2007 |
| JP | 4215898 | 11/2008 |
| JP | 4270570 | 3/2009 |
| JP | 4544592 | 7/2010 |
| JP | 2011-202160 | 10/2011 |
| JP | 2012-116873 | 6/2012 |
| WO | WO2005/048866 A2 | 6/2005 |
| WO | WO2009/128957 | 10/2009 |

OTHER PUBLICATIONS

Extended European Search Report dated Oct. 1, 2013 in corresponding European patent application No. 13 17 9920.7.
Japanese official action (including machine translation thereof into English) dated Mar. 27, 2017 in connection with corresponding Japanese patent application No. 2013-122531.

* cited by examiner

*Primary Examiner* — Michael F Pepitone
*Assistant Examiner* — Jessica M Roswell
(74) *Attorney, Agent, or Firm* — Cooper & Dunham LLP

(57) ABSTRACT

An active ray-curable composition characterized by containing a photobase generator, a double bond-containing compound, and a β-dicarbonyl compound.

19 Claims, No Drawings

ACTIVE RAY-CURABLE COMPOSITION, AND ACTIVE RAY-CURABLE INKJET PRINTING INK COMPOSITION AND ACTIVE RAY-CURABLE ADHESIVE COMPOSITION USING THE SAME

BACKGROUND OF THE INVENTION

Field of the Invention

The present invention relates to an active ray-curable composition, and an active ray-curable inkjet printing ink composition and an active ray-curable adhesive composition using the active ray-curable composition.

Description of the Related Art

An active ray-curable composition has been preferably used in applications such as an inkjet printing ink composition, an adhesive composition, and a resist material.

Representative example of the active ray-curable composition includes a combination of a radical reactive compound with a photoradical initiator. This system is disadvantageous in that, although a reaction proceeds rapidly, radicals are deactivated by oxygen immediately to thereby stop the reaction, so that residual monomers are difficult to be consumed completely.

Additionally, as a system which is not inhibited by oxygen, a combination of a cation reactive compound with a photoacid generator has been known. In this system, an acid serving as a reaction active species is not deactivated immediately. Therefore, a reaction proceeds even after a termination of photoirradiation, so that residual monomers are consumed. However, the acid serving as a reaction active species is generally a strong acid, which may be problematic in that the strong acid corrodes and denatures a substrate.

Additionally, there have been few examples of using a combination of an anion reactive compound with a photobase generator. In this system, a reaction proceeds even with a weak base. Therefore, unlike the above cation system, a problem regarding corrosion is not occurred. However, the reaction proceeds very slowly, which is problematic.

A combination of a Michael acceptor, a Michael donor, and a base utilizing a Michael addition reaction has also been known (see, for example, Japanese Patent (JP-B) Nos. 4544592, 4218898, and 4270570, Japanese Patent Application Laid-Open (JP-A) No. 2004-209471, and JP-B No. 2642324). However, any systems described in JP-B Nos. 4544592, 4218898, and 4270570, JP-A No. 2004-209471, and JP-B No. 2642324 have disadvantages such as a time-consuming reaction, a need for heat, or a need for pre-separating out each ingredient contained in a composition.

SUMMARY OF THE INVENTION

The present invention has been made to solve the above problems, and aims to provide an active ray-curable composition which does not have a necessity to be pre-separated into each ingredient contained in the composition and has an excellent curability.

The present inventors conducted various studies, and have found that the above object can be achieved by combining a Michael addition donating compound with an anion-polymerizable active ray-curable composition containing a photobase generator and a double bond-containing compound. Based on this finding, the present invention has been accomplished.

That is, the active ray-curable composition according to the present invention is characterized by containing a photobase generator, a double bond-containing compound, and a β-dicarbonyl compound.

As described above, according to the present invention, an active ray-curable composition which does not have a necessity to be pre-separated into each ingredient contained in the composition and has an excellent curability can be provided by combining a photobase generator, a double bond-containing compound, and a β-dicarbonyl compound.

DETAILED DESCRIPTION OF THE INVENTION

As an active ray-curable composition, a combination of a radical reactive compound with a photoradical initiator, a combination of a cation reactive compound with a photoacid generator, and a combination of an anion reactive compound with a photobase generator have been known. However, any combinations have disadvantages as mentioned above.

Accordingly, the present invention is characterized by allowing a curing to proceed by adding a β-dicarbonyl compound to a mixed system containing a photobase generator and a double bond-containing compound to thereby combine a usual polymerization reaction with a cross-linking reaction via a Michael addition. That is, the active ray-curable composition of the present invention is characterized by containing at least a photobase generator, a double bond-containing compound, and a β-dicarbonyl compound.

A Michael addition using a Michael addition donating β-dicarbonyl compound is a reaction in which a hydrogen atom abstraction at position α by a base triggers an addition of the Michael addition donating β-dicarbonyl compound to a double bond in a Michael addition accepting compound. Accordingly, the active ray-curable composition of the present invention is characterized by not having a basic property before stimulation and using a photobase generator which generates a base by light. A base generated by light can allow a reaction to proceed without being denatured even after a termination of photoirradiation, so that unreacted compounds can be consumed.

Hereinafter, each ingredient contained in the active ray-curable composition of the present invention will be explained in more detail.

(Photobase Generator)

A photobase generator contained in an active ray-curable composition of the present invention is a compound which initiates a polymerization reaction of a Michael addition accepting double bond-containing compound and abstracts a hydrogen atom at position cc in a Michael addition donating β-dicarbonyl compound. The photobase generator is preferably contained in a range of 1 part by mass to 40 parts by mass, more preferably 3 parts by mass to 30 parts by mass, further preferably 5 parts by mass to 20 parts by mass when the total of the double bond-containing compound and the β-dicarbonyl compound in the active ray-curable composition is defined as 100 parts by mass.

The photobase generator may be those conventionally known. For example, oxime esters, quarternary ammonium salts, acyl compounds, carbamates, aminoacetophenones, and compounds consisting of salts of carboxylic acids and bases can be used. Examples thereof include but not limited to the following compounds represented by Structural Formulas (A-1) to (A-12).

(A-1) 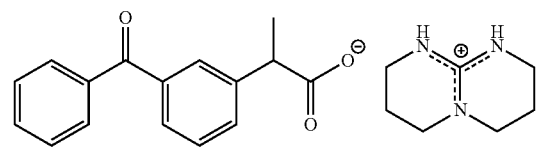

(A-2) 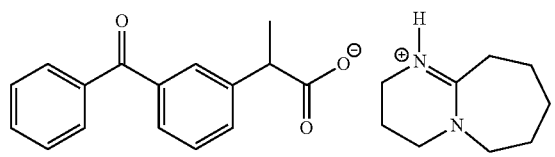

(A-3) 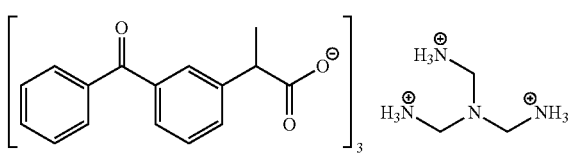

(A-4) 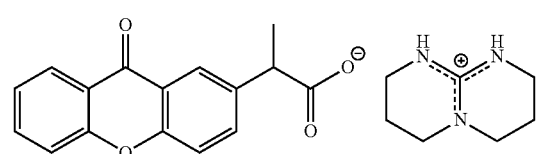

(A-5) 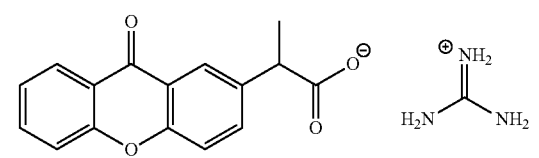

(A-6) 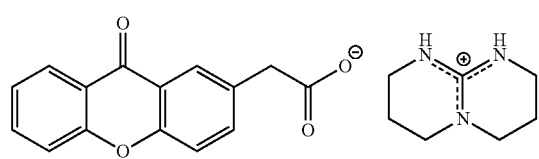

(A-7) 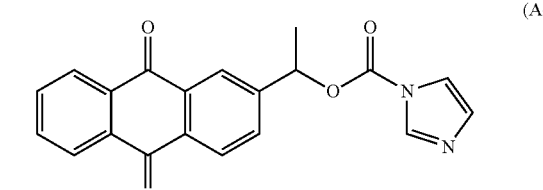

(A-8) 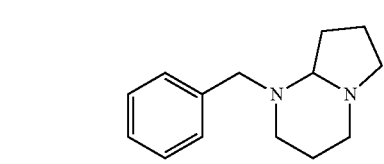

(A-9) 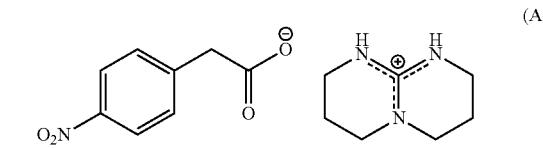

(A-10) 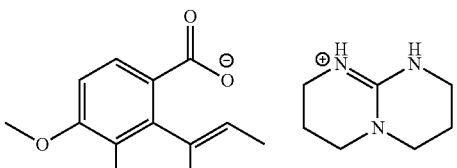

(A-11) 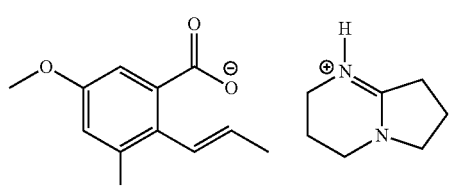

(A-12) 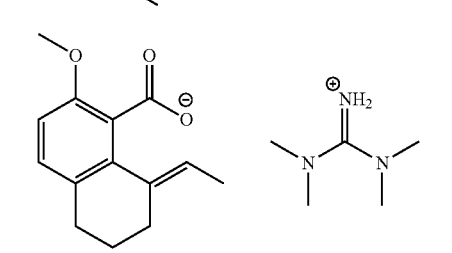

(Double Bond-Containing Compound)

The double bond-containing compound in the active ray-curable composition of the present invention can polymerize through double bond sites, and further react with the β-dicarbonyl compound via a Michael addition, Therefore, the number of functional groups in the double bond-containing compound is preferably more than that of in the β-dicarbonyl compound.

The double bond-containing compound is not particularly limited as long as it is a Michael addition acceptor and may be those conventionally known. Examples thereof include (meth)acrylate compounds, (meth)acrylamide compounds, and vinyl ester compounds. Among them, it is preferably one or more selected from the group consisting of (meth)acrylate compounds and (meth)acrylamide compounds from the viewpoint of high reactivity. Examples of the double bond-containing compound include but not limited to the following compounds represented by Structural Formulas (B-1) to (B-14).

(B-1) 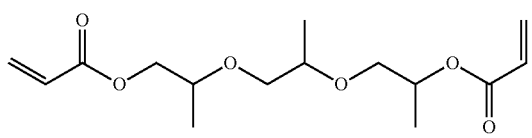

(B-2) 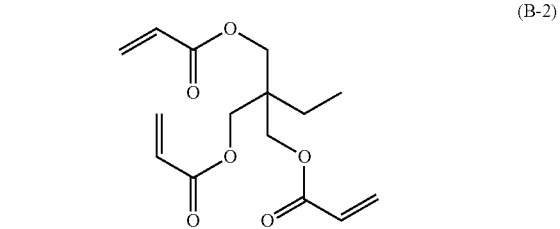

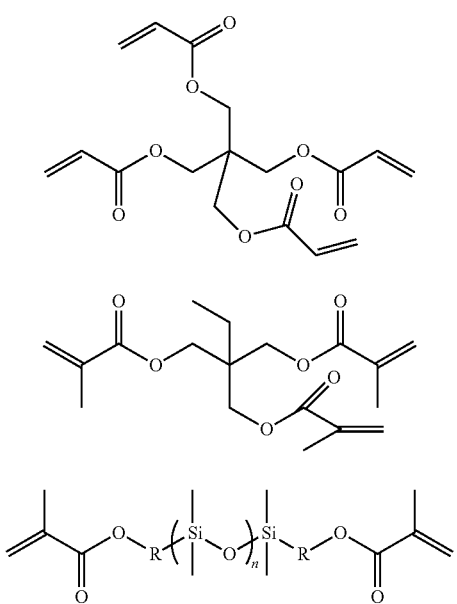

(B-3)
(B-4)
(B-5)
(B-6)
(B-7)
(B-8)
(B-9)
(B-10)

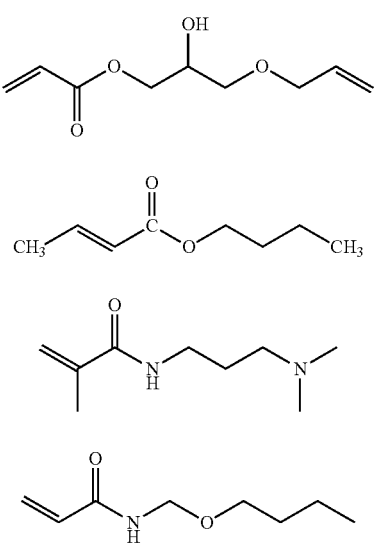

(B-11)
(B-12)
(B-13)
(B-14)

In the Structural Formula (B-5), R denotes a propylene group and n denotes an integer of 1 to 3.

(β-Dicarbonyl Compound)

The β-dicarbonyl compound of the present invention is a compound from which a hydrogen atom at position α is abstracted by a base to thereby react with the Michael addition accepting double bond-containing compound via a Michael addition.

The β-dicarbonyl compound is not particularly limited as long as it is a Michael addition donor and may be those conventionally known. Examples thereof include but not limited to the following compounds represented by Structural Formulas (C-1) to (C-6).

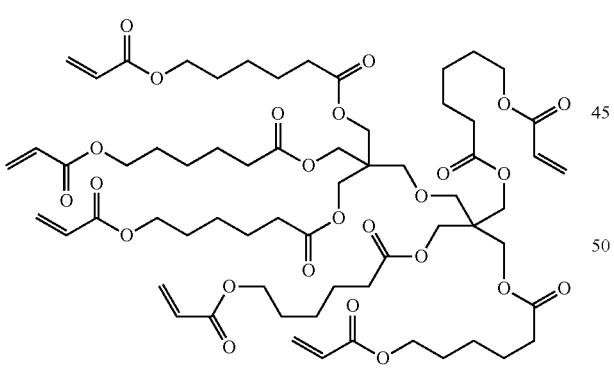

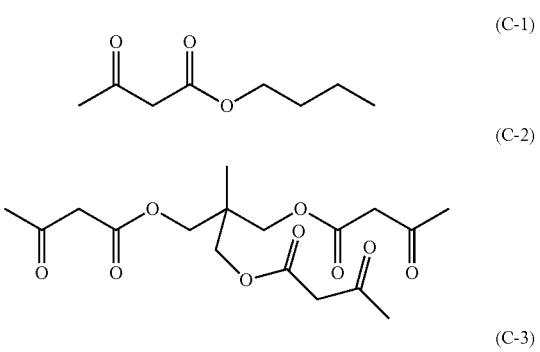

(C-1)
(C-2)

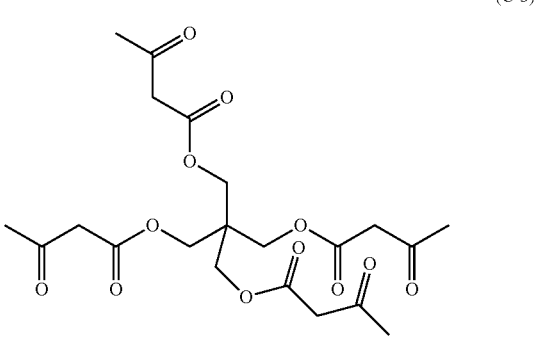

(C-3)

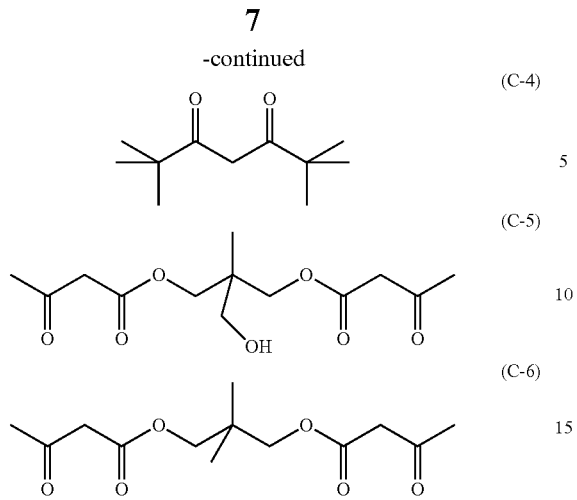

Among them, it is preferably an acetoacetic ester compound from the viewpoints of high reactivity and easiness of synthesis.

The double bond-containing compound and/or the β-dicarbonyl compound is preferably a polyfunctional compound being capable of forming a network structure through a cross-linking reaction. Notably, the term "polyfunctional" means having two or more, preferably three or more Michael addition accepting double bond sites per one molecule in the case of the double bond-containing compound; and having two or more, preferably three or more Michael addition donating β-dicarbonyl sites per one molecule in the case of the β-dicarbonyl compound.

—Carboxylic Acid Losing Function as Acid by Active Ray Irradiation or Heat—

Additionally, an excess of acid may be added to the active ray-curable composition of the present invention in order to improve storage stability during unused period, which can stop a reaction from proceeding through neutralization even when a base generates by, for example, unintended stimulation. However, it is not preferable to add a usual acid because it also neutralizes a base which generates from the photobase generator upon using. Therefore, among carboxylic acids, preferred are those losing a function as acid by being decarbonized with active ray irradiation or heat. Suitable example of an acid losing a function as acid by heat includes those losing a function as acid at a temperature of 200° C. or more.

In the case where the above-described acid is added, the acid is preferably contained in the active ray-curable composition in an amount of 10 mol to 500 mol, more preferably 20 mol to 300 mol, further preferably 50 mol to 200 mol relative to 100 mol of the photobase generator.

Examples of an acid losing a function as acid by being decarbonized with active ray irradiation or heat include but not limited to the following compounds represented by Structural Formulas (D-1) to (D-6).

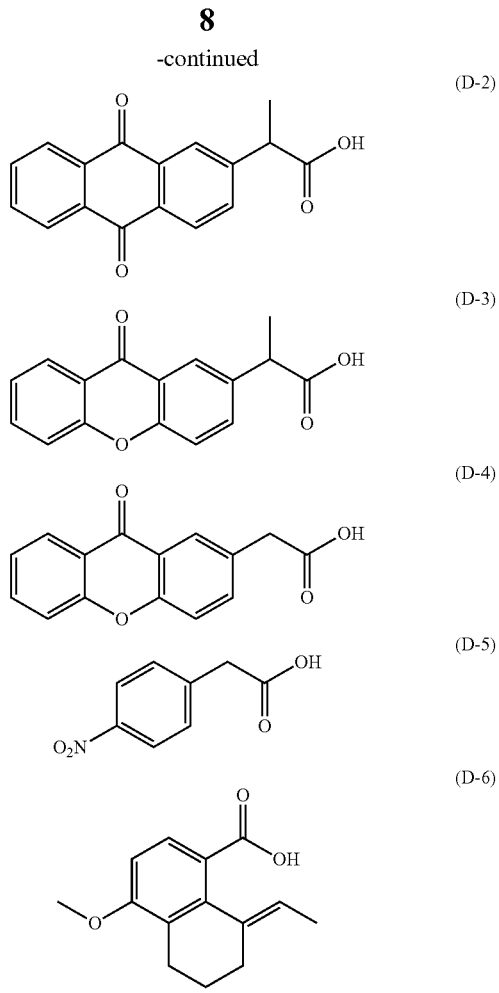

—Photoradical Polymerization Initiator—

A photoradical polymerization initiator may further added to the active ray-curable composition of the present invention, which can increase curing speed. In the case where the photoradical polymerization initiator is added, it is preferably contained in a range of 1 part by mass to 40 parts by mass, more preferably 3 parts by mass to 20 parts by mass, further preferably 5 parts by mass to 20 parts by mass when the total of the double bond-containing compound and the β-dicarbonyl compound in the active ray-curable composition is defined as 100 parts by mass.

The photoradical polymerization initiator may be those conventionally known, but benzophenones, alkylphenones, acylphosphine oxides, oxyphenylacetic esters, benzoin ethers, oxime esters, or thioxanthones may be preferably used. Specific examples thereof include but not limited to the following compounds represented by Structural Formulas (E-1) to (E-4).

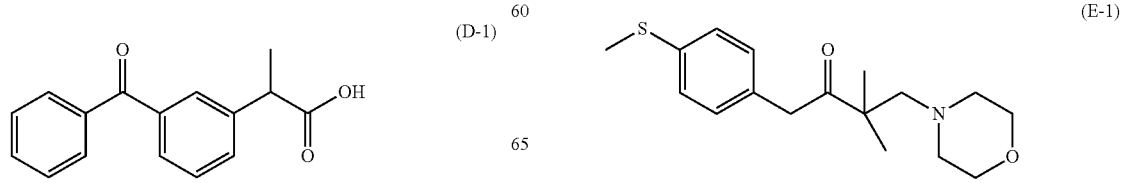

-continued

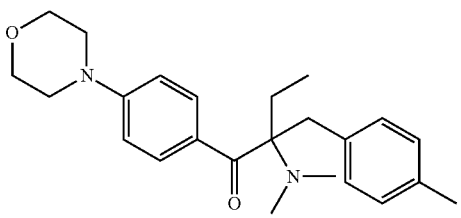
(E-2)

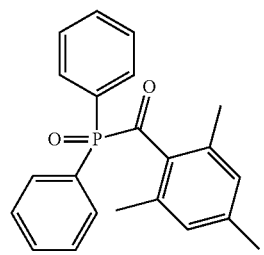
(E-3)

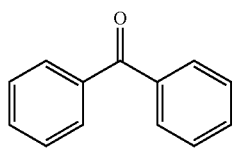
(E-4)

—Other Ingredients—

The active ray-curable composition of the present invention may, if necessary, contain various additives such as a coloring agent, a sensitizer, a storage stabilizer or other additives for improving various properties. Also, the active ray-curable composition may contain various solvents for the purpose of adjusting viscosity.

Examples of the coloring agent added in the case where the active ray-curable composition of the present invention is used as an inkjet printing ink composition include various known dyes and pigments. In the case of using pigments, a dispersing agent may be used, if necessary. Particularly preferably, the coloring agent is excellent in light resistance and color reproducibility, and does not affect a curing reaction.

An active ray which may be used for curing the active ray-curable composition of the present invention is appropriately selected depending on a photosensitizing wavelength of a photoinitiator and a sensitizer, but preferably is an ultraviolet ray. Examples of light sources thereof include various known light sources such as a mercury lamp, a metal halide lamp, a xenon lamp, or a LED.

An application of the active ray-curable composition of the present invention is not particularly limited as long as it is those in which a photocurable material is commonly used. For example, the active ray-curable composition may be used as an active ray-curable inkjet printing ink or an active ray-curable adhesive.

EXAMPLES

Examples of the present invention will be described hereinafter, but the scope of the present invention is not limited thereto. Notably, the term "part(s)" described in Examples means "part(s) by mass."

[Examples 1 to 34] and [Comparative Examples 1 and 2]

Active ray-curable compositions were prepared according to materials and composition ratios described in Table 1-1. Notably, numbers of compounds described in Table 1-1 correspond to that of compounds exemplified above.

The following pigments were used,
CB: MICROLITH Black C-K (carbon black pigment, product of BASF Japan)
Blue: MICROLITH Blue 4G-K (product of BASF Japan)
[Experimental Procedure]

The active ray-curable compositions of Examples and Comparative Examples were applied onto slide glasses and heated for 30 seconds on a hot plate at 80° C.

The above samples were irradiated with light to thereby cure compositions on the slide glasses. The light was irradiated by a metal halide lamp (1,200 mJ/cm$^2$: UVA) in the case of Examples 1 to 32 and Comparative Examples 1 and 2, and by a metal halide lamp (1,0000 mJ/cm$^2$: UVA) in the case of Examples 33 and 34.

Also, the term "heating" in Table means a heating at 80° C. for 5 min performed after the irradiation.
[Evaluation]

The active ray-curable compositions of Examples 1 to 34 and Comparative Examples 1 and 2 were evaluated for photocurability and postcurability by a pencil hardness test. Evaluation results are shown in Table 1-2.

Notably, the pencil hardness test was performed according to JIS K5600-5-4 (Scratch hardness: Pencil method).

TABLE 1-1

| | Double bond-containing compound | β-dicarbonyl compound | Photobase generator/ Photoradical polymerization initiator | Solvent | Carboxylic acid | Pigment |
|---|---|---|---|---|---|---|
| Ex. 1 | B-3 (100) | C-3 (50) | A-4 (10) | Methanol (50) | — | — |
| Ex. 2 | B-3 (100) | C-3 (50) | A-4 (10) | Methanol (50) | — | — |
| Ex. 3 | B-3 (100) | C-2 (50) | A-4 (10) | Methanol (50) | — | — |
| Ex. 4 | B-3 (100) | C-2 (50) | A-4 (10) | Methanol (50) | — | — |
| Ex. 5 | B-3 (100) | C-1 (50) | A-4 (10) | Methanol (50) | — | — |
| Ex. 6 | B-3 (100) | C-1 (50) | A-4 (10) | Methanol (50) | — | — |
| Ex. 7 | B-3 (100) | C-3 (50) | A-1 (10) | Methanol (50) | — | — |
| Ex. 8 | B-3 (100) | C-3 (50) | A-1 (10) | Methanol (50) | — | — |
| Ex. 9 | B-3 (100) | C-3 (50) | A-4 (10) | Methanol (50) | D-1 (10) | — |
| Ex. 10 | B-3 (100) | C-3 (50) | A-4 (10) | Methanol (50) | D-1 (10) | — |
| Ex. 11 | B-2 (100) | C-3 (50) | A-1 (10) | Methanol (50) | — | — |
| Ex. 12 | B-2 (100) | C-3 (50) | A-1 (10) | Methanol (50) | — | — |
| Ex. 13 | B-2 (100) | C-3 (50) | A-1 (10) | — | — | — |
| Ex. 14 | B-2 (100) | C-3 (50) | A-1 (10) | — | — | — |
| Ex. 15 | B-2 (100) | C-3 (50) | A-1 (10) | — | — | CB (3) |

TABLE 1-1-continued

| | Double bond-containing compound | β-dicarbonyl compound | Photobase generator/ Photoradical polymerization initiator | Solvent | Carboxylic acid | Pigment |
|---|---|---|---|---|---|---|
| Ex. 16 | B-2 (100) | C-3 (50) | A-1 (10) | — | — | CB (3) |
| Ex. 17 | B-2 (100) | C-3 (50) | A-1 (10) | — | — | Blue (3) |
| Ex. 18 | B-2 (100) | C-3 (50) | A-1 (10) | — | — | Blue (3) |
| Ex. 19 | B-8 (100) | C-3 (50) | A-4 (10) | Methanol (50) | — | — |
| Ex. 20 | B-8 (100) | C-3 (50) | A-4 (10) | Methanol (50) | — | — |
| Ex. 21 | B-14 (50)/B-3 (50) | C-2 (60) | A-5 (15) | Methanol (50) | — | — |
| Ex. 22 | B-14 (50)/B-3 (50) | C-2 (60) | A-5 (15) | Methanol (50) | — | — |
| Ex. 23 | B-3 (100) | C-3 (50) | A-1 (4)/A-4 (4) | Methanol (50) | — | — |
| Ex. 24 | B-3 (100) | C-3 (50) | A-1 (4)/A-4 (4) | Methanol (50) | — | — |
| Ex. 25 | B-3 (100) | C-1 (20)/C-3 (20) | A-4 (10) | Methanol (50) | — | — |
| Ex. 26 | B-3 (100) | C-1 (20)/C-3 (20) | A-4 (10) | Methanol (50) | — | — |
| Ex. 27 | B-2 (100) | C-3 (50) | A-1 (8)/E-4 (5) | — | — | — |
| Ex. 28 | B-2 (100) | C-3 (50) | A-1 (8)/E-4 (5) | — | — | — |
| Ex. 29 | B-3 (100) | C-3 (50) | A-12 (15) | Methanol (50) | — | — |
| Ex. 30 | B-3 (100) | C-3 (50) | A-12 (15) | Methanol (50) | — | — |
| Ex. 31 | B-2 (100) | C-5 (50) | A-12 (15) | Methanol (50) | — | — |
| Ex. 32 | B-2 (100) | C-5 (50) | A-12 (15) | Methanol (50) | — | — |
| Ex. 33 | B-3 (100) | C-4 (50) | A-1 (10) | Methanol (50) | — | — |
| Ex. 34 | B-3 (75)/B-10 (25) | C-3 (50) | A-1 (10) | Methanol (50) | — | — |
| Comp. Ex. 1 | B-3 (100) | — | A-4 (10) | Methanol (50) | — | — |
| Comp. Ex. 2 | B-3 (100) | — | A-4 (10) | Methanol (50) | — | — |

In the Table, numerals in parentheses indicate composition ratios (unit: parts by mass).

TABLE 1-2

| | Heating | Pencil Hardness | | |
|---|---|---|---|---|
| | | Immediately after irradiation | 2 hours after | 24 hours after |
| Ex. 1 | No | There were tacks. | | 3H |
| Ex. 2 | Yes | 4H | | |
| Ex. 3 | No | There were tacks. | | H |
| Ex. 4 | Yes | 3H | | |
| Ex. 5 | No | There were tacks. | There were tacks. | HB |
| Ex. 6 | Yes | There were tacks. | | HB |
| Ex. 7 | No | There were tacks. | | 3H |
| Ex. 8 | Yes | 3H | | |
| Ex. 9 | No | There were tacks. | There were tacks. | F |
| Ex. 10 | Yes | There were tacks. | There were tacks. | F |
| Ex. 11 | No | There were tacks. | There were tacks. | H |
| Ex. 12 | Yes | There were tacks. | There were tacks. | 2H |
| Ex. 13 | No | There were tacks. | There were tacks. | F |
| Ex. 14 | Yes | There were tacks. | There were tacks. | 2H |
| Ex. 15 | No | There were tacks. | There were tacks. | H |
| Ex. 16 | Yes | There were tacks. | There were tacks. | 2H |
| Ex. 17 | No | There were tacks. | There were tacks. | H |
| Ex. 18 | Yes | There were tacks. | There were tacks. | 2H |
| Ex. 19 | No | There were tacks. | There were tacks. | HB |
| Ex. 20 | Yes | B | | |
| Ex. 21 | No | There were tacks. | There were tacks. | F |
| Ex. 22 | Yes | There were tacks. | There were tacks. | HB |
| Ex. 23 | No | There were tacks. | | 3H |
| Ex. 24 | Yes | 4H | | |
| Ex. 25 | No | There were tacks. | | 5H |
| Ex. 26 | Yes | 5H | | |
| Ex. 27 | No | There were tacks. | | F |
| Ex. 28 | Yes | There were tacks. | | H |
| Ex. 29 | No | There were tacks. | There were tacks. | 3H |
| Ex. 30 | Yes | There were tacks. | | 4H |
| Ex. 31 | No | There were tacks. | There were tacks. | 2H |
| Ex. 32 | Yes | There were few tacks. | There were few tacks. | H |
| Ex. 33 | No | There were few tacks. | | 5H |
| Ex. 34 | No | There were few tacks. | | 5H |
| Comp. Ex. 1 | No | There were tacks. | There were tacks. | There were tacks. |
| Comp. Ex. 2 | Yes | There were tacks. | There were tacks. | There were tacks. |

It can be seen from the results in Table 1-2 that, in a combination of the photobase generator, the double bond-containing compound, and the β-dicarbonyl compound, tacks are eliminated by a post-irradiation reaction after heating and/or standing even though tacks remain immediately after the irradiation.

Additionally, in the case where polyfunctional compounds C-2 and C-3 were used as the β-dicarbonyl compound, the curing speed was faster than the case where a monofunctional compound C-1 was used. In the case where the photoradical polymerization initiator was used together, the curing speed was increased.

In the case of the system which was free of the β-dicarbonyl compound such as Comparative Examples 1 and 2, the reaction did not proceed after the irradiation and tacks remained.

[Storage Stability Test]

The composition of Example 9 was evaluated for its stability after heating at 70° C. for 1 week.

As a result, the composition of Example 9 was confirmed that it was not solidified.

[Application as Inkjet Ink]

The following 3 compositions were prepared as inkjet inks and tested: the active ray-curable composition of Example 3, a composition which was prepared by adding 3 parts of the CB to the composition of Example 3, and a composition which was prepared by adding 3 parts of the Blue to the composition of Example 3.

The inkjet inks were inkjet-discharged onto commercially available slide glasses to thereby form films. The resultant films were irradiated with light at 0.2 mW/cm² by UV irradiation device LH6 (product of Fusion Systems Co., Ltd.) to thereby being cured. As a result, the inkjet inks were confirmed to have a good curability. The inkjet inks were cured 2 hours after the irradiation. The inkjet inks had a low viscosity and a good dischargeability before curing.

This application claims priority to Japanese application No. 2012-177895, filed on Aug. 10, 2012 and Japanese application No. 2013-122531, filed on Jun. 11, 2013, and incorporated herein by reference.

What is claimed is:
1. An active ray-curable composition, comprising:
   a photobase generator;
   a double bond-containing compound; and
   a β-dicarbonyl compound,
   wherein the photobase generator is a compound represented by one of the following Structural Formulas (A-1) to (A-6) and (A-9) to (A-12):

(A-1)
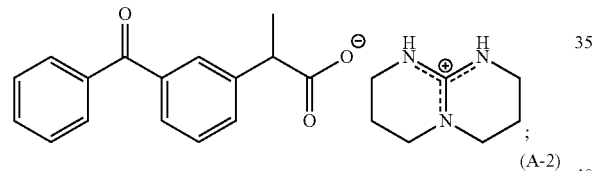

(A-2)
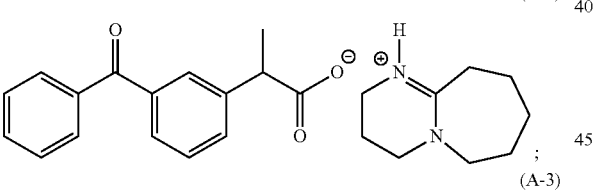

(A-3)
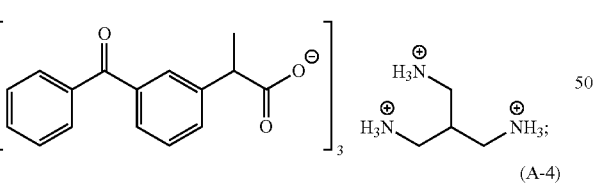

(A-4)
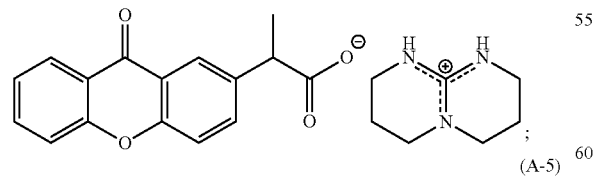

(A-5)
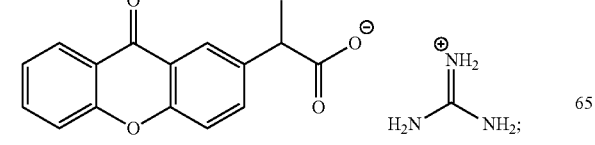

(A-6)
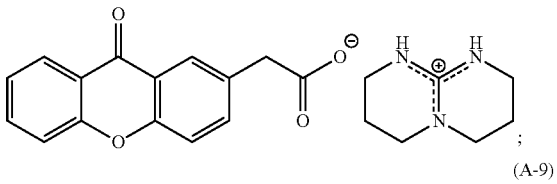

(A-9)
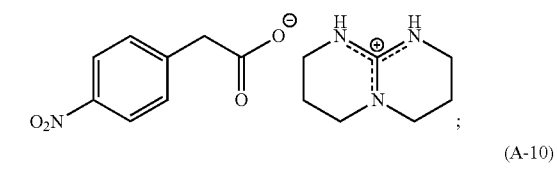

(A-10)
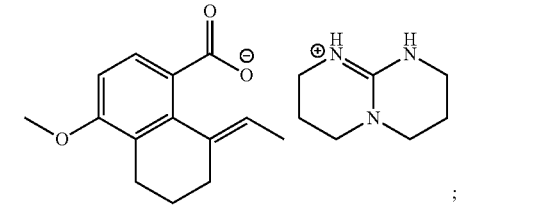

(A-11)
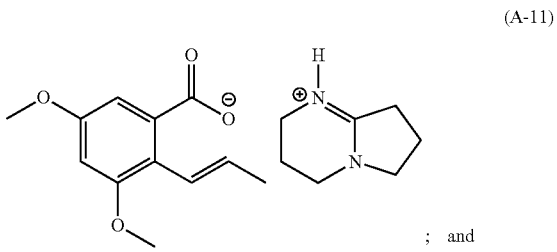

; and (A-12)
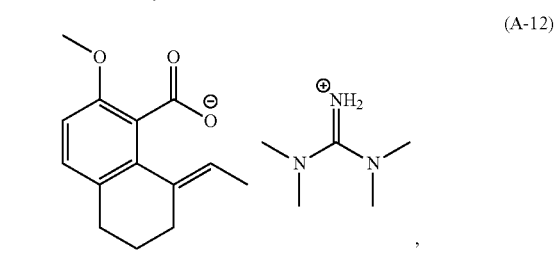

, wherein the β-dicarbonyl compound is a compound represented by one of the following Structural Formulas (C-1), (C-2), (C-4) and (C-5):

(C-1)
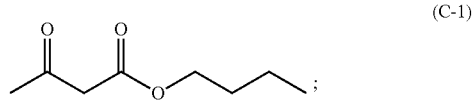

;

(C-2)
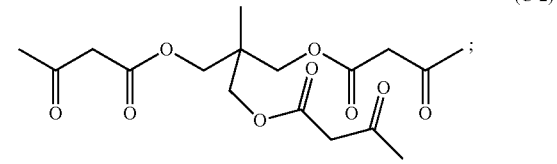

;

(C-4)
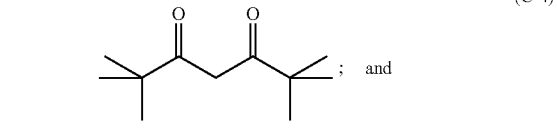

; and (C-5)

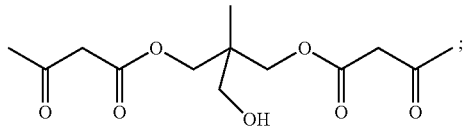

wherein the β-dicarbonyl compound is included in the active ray-curable composition in an amount of from 40 parts by mass to 60 parts by mass based on 100 parts by mass of the double bond-containing compound.

2. The active ray-curable composition according to claim 1, wherein the double bond-containing compound is one or more selected from the group consisting of (meth)acrylate compounds and (meth)acrylamide compounds.

3. The active ray-curable composition according to claim 1, wherein the β-dicarbonyl compound is an acetoacetic ester compound.

4. The active ray-curable composition according to claim 1, wherein either one or both of the double bond-containing compound and the β-dicarbonyl compound are polyfunctional.

5. The active ray-curable composition according to claim 1, further comprising a carboxylic acid which is decarbonized with active ray irradiation or heat.

6. The active ray-curable composition according to claim 1, further comprising a photoradical polymerization initiator.

7. An active ray-curable inkjet printing ink composition, comprising:
   an active ray-curable composition;
   wherein the active ray-curable composition comprises
      a photobase generator,
      a double bond-containing compound, and
      a β-dicarbonyl compound,
   wherein the photobase generator is a compound represented by one of the following Structural Formulas (A-1) to (A-6) and (A-9) to (A-12):

(A-1)

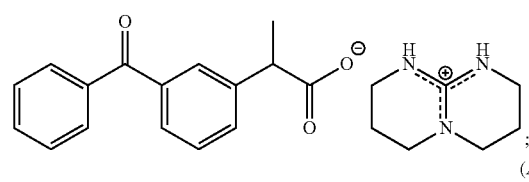

(A-2)

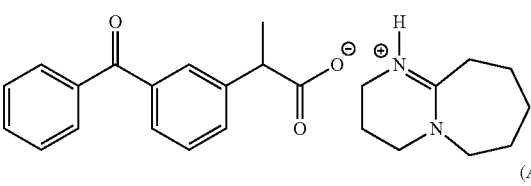

(A-3)

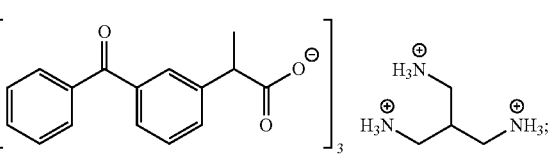

(A-4)

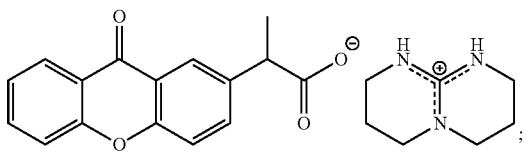

(A-5)

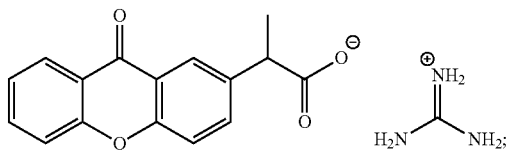

(A-6)

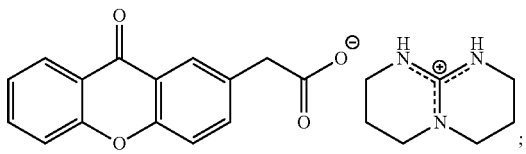

(A-9)

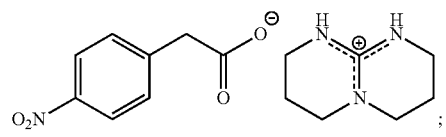

(A-10)

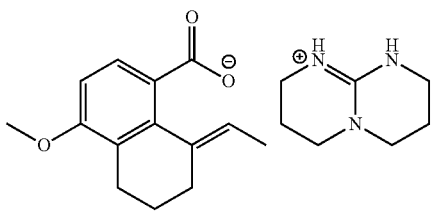

(A-11)

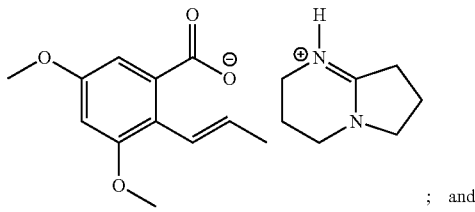

; and (A-12)

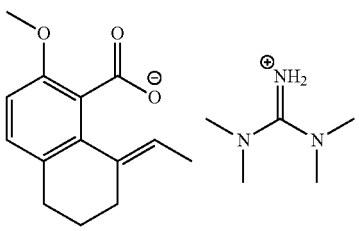

, wherein the β-dicarbonyl compound is a compound represented by one of the following Structural Formulas (C-1), (C-2), (C-4) and (C-5):

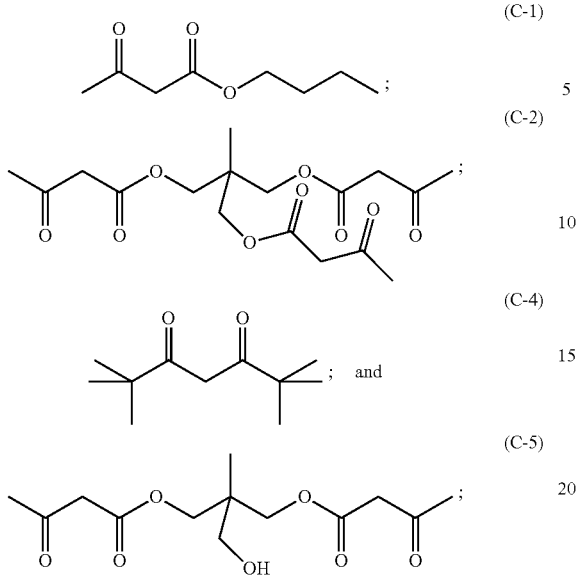

and
wherein the β-dicarbonyl compound is included in the active ray-curable composition in an amount of from 40 parts by mass to 60 parts by mass based on 100 parts by mass of the double bond-containing compound.

8. The active ray-curable inkjet printing ink composition according to claim 7, wherein the double bond-containing compound is one or more selected from the group consisting of (meth)acrylate compounds and (meth)acrylamide compounds.

9. The active ray-curable inkjet printing ink composition according to claim 7, wherein the β-dicarbonyl compound is an acetoacetic ester compound.

10. The active ray-curable inkjet printing ink composition according to claim 7, wherein either one or both of the double bond-containing compound and the β-dicarbonyl compound are polyfunctional.

11. The active ray-curable inkjet printing ink composition according to claim 7, further comprising a carboxylic acid which is decarbonized with active ray irradiation or heat.

12. The active ray-curable inkjet printing ink composition according to claim 7, further comprising a photoradical polymerization initiator.

13. An active ray-curable adhesive composition, wherein the active ray-curable adhesive composition includes the active ray-curable composition according to claim 1.

14. The active ray-curable adhesive composition according to claim 13, wherein the double bond-containing compound is one or more selected from the group consisting of (meth)acrylate compounds and (meth)acrylamide compounds.

15. The active ray-curable adhesive composition according to claim 13, wherein the β-dicarbonyl compound is an acetoacetic ester compound.

16. The active ray-curable adhesive composition according to claim 13, wherein either one or both of the double bond-containing compound and the β-dicarbonyl compound are polyfunctional.

17. The active ray-curable adhesive composition according to claim 13, further comprising a carboxylic acid which is decarbonized with active ray irradiation or heat.

18. The active ray-curable adhesive composition according to claim 13, further comprising a photoradical polymerization initiator.

19. An active ray-curable composition, comprising:
a photobase generator, a double bond-containing compound and a 3-dicarbonyl compound,
wherein the photobase generator is a compound represented by one of the following Structural Formulas (A-1) to (A-6) and (A-9) to (A-12)

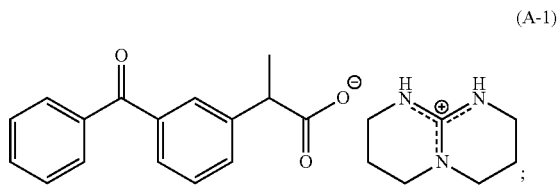

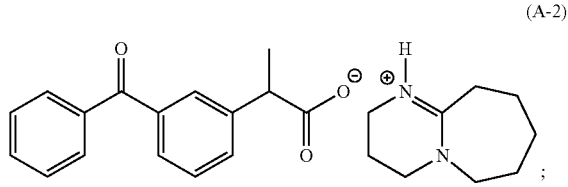

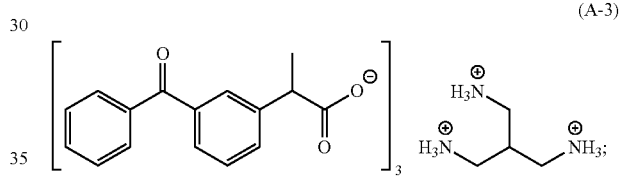

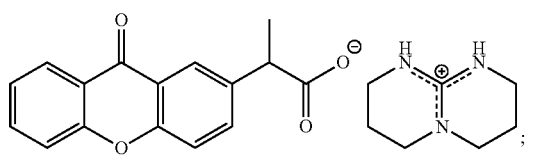

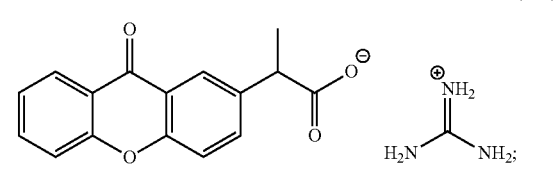

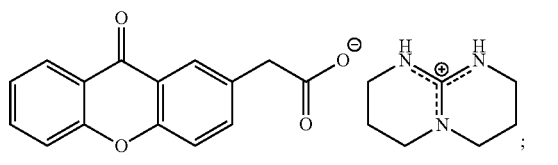

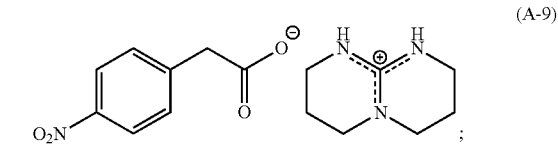

-continued
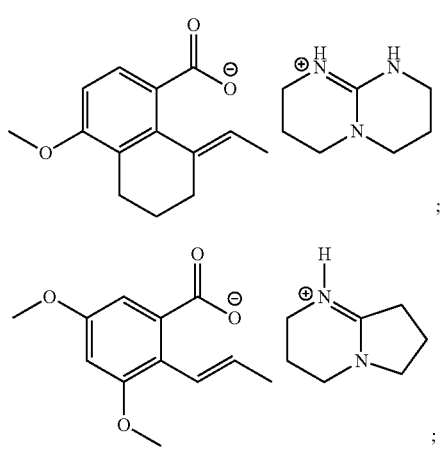
(A-10)
(A-11)
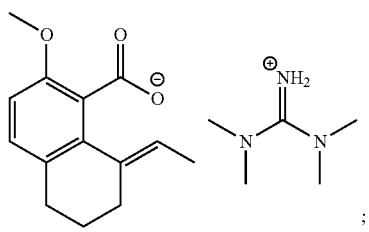
(A-12)
and
wherein the β-dicarbonyl compound is included in the active ray-curable composition in an amount of from 40 parts by mass to 60 parts by mass based on 100 parts by mass of the double bond-containing compound.
* * * * *